Nov. 20, 1928.
J. A. SPAHN
1,692,710
CONDUIT BUSHING
Filed Feb. 25, 1925
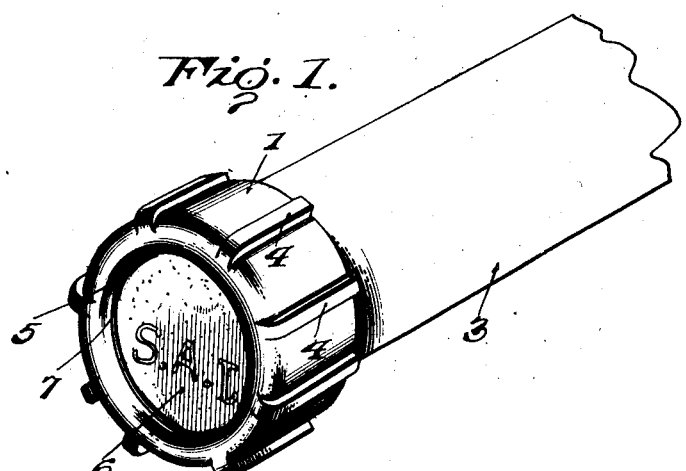
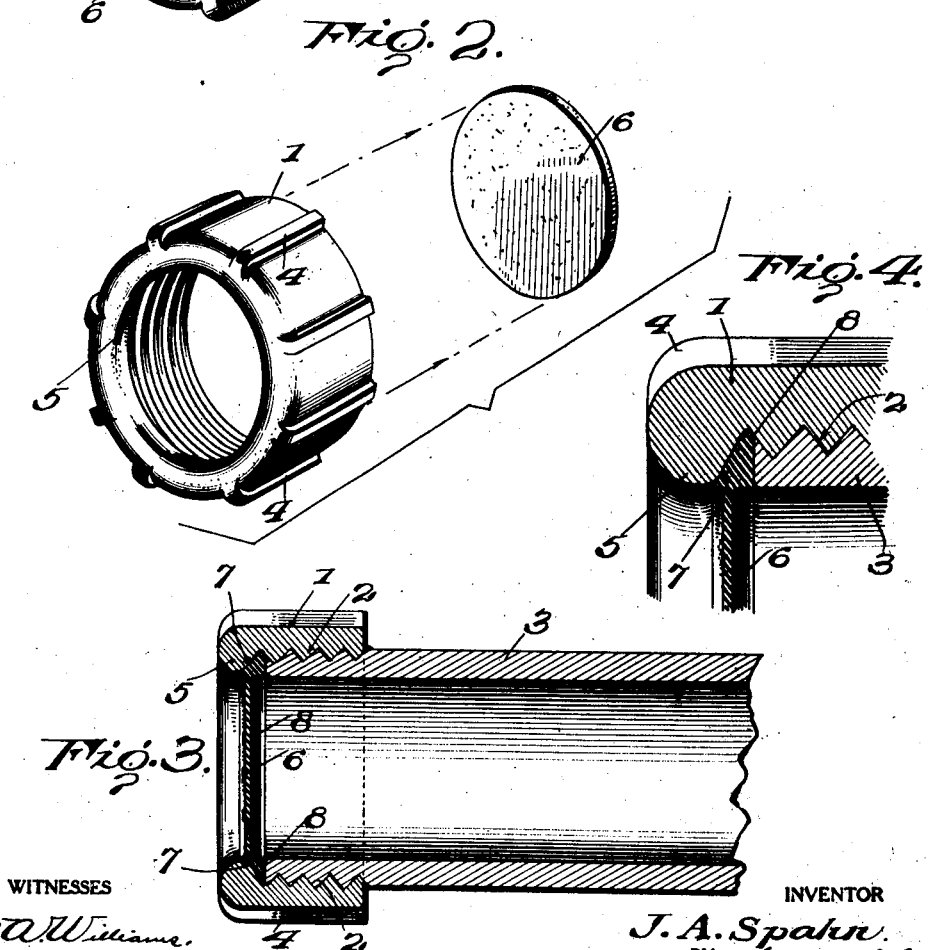
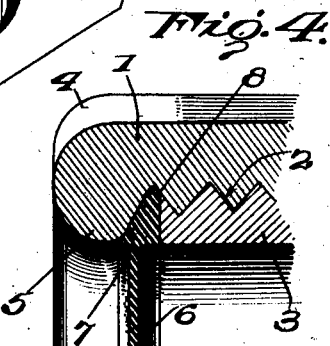
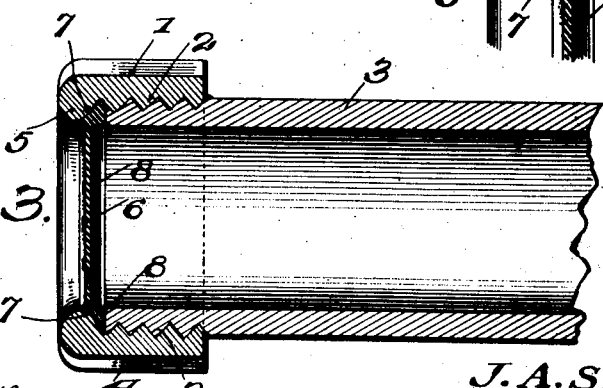
INVENTOR
J. A. Spahn
BY
ATTORNEYS Patented Nov. 20, 1928.

1,692,710

UNITED STATES PATENT OFFICE.

JOHN A. SPAHN, OF WILMINGTON, DELAWARE.

CONDUIT BUSHING.

Application filed February 25, 1925. Serial No. 11,616.

This invention relates in general to conduit bushings adapted for electrical work and more particularly relates to a conduit bushing which also has embodied therein a seal.

The object of the invention resides in the provision of a device of this character wherein the seal renders the bushing air and water tight and also serves to lock the bushing to the pipe or conduit so that it will not come off under the influence of vibration or by reason of other causes.

Another object is the provision of a device of this character in which the insulation on wiring is protected from the rough edges of conduit so that damage to the insulation is precluded.

A still further object is the provision of a bushing of this type which is so constructed that when used in concrete structure will prevent the concrete from entering the conduit.

Still another object resides in the provision of a conduit bushing which has labor saving features especially in that when the bushing is installed it is not necessary to remove the seal.

Other objects and advantages reside in certain novel features of the construction, arrangement and combination of parts which will be hereinafter more fully described and particularly pointed out in the appended claim, reference being had to the accompanying drawings forming a part of this specification, and in which:

Figure 1 is a perspective view showing a conduit bushing and seal embodying the present invention, Figure 2 is a group view in perspective showing the seal and bushing prior to assembly, Figure 3 is a view in section of the device as shown in Figure 1, and Figure 4 is an enlarged fragmentary view showing how the seal engages the bushing.

Referring to the drawings the numeral 1 designates a tubular body which is preferably of cylindrical form and which has internal screw threads 2 to adapt it for threaded engagement with a pipe or conduit 3. Externally the tubular body is formed with ribs 4 to facilitate turning of the same.

At one end the tubular body 1 is formed with an inturned portion or flange 5 which constitutes the bushing. This bushing is curved and formed as shown in the drawings and merges on its inner side into the internal screw thread 2.

A sealing member 6 is provided and consists of a thin disc of deformable and malleable metal such as lead or any other suitable alloy which is thicker at its periphery than at its center. The periphery of the disc is pressed against the inner side of the bushing 5 as shown to advantage in Figures 3 and 4 so that the thick peripheral portion of the disc is united to the bushing by cohesion over a relatively large area. The juncture of the sealing member 6 and the bushing 5 is designated at 7. The inner peripheral portion of the sealing member 6 is displaced inwardly of the tubular body as indicated at 8, and the portion 8 of the sealing member lies in part at least in certain of the screw threads 2 so that when the tubular body is turned up on the pipe 3 the portion 8 of the sealing member becomes wedged in between the threads and locks the tubular body on the pipe.

The sealing member 6 is so united to the body as to make the bushing air tight and water tight and prevent inflow of concrete when the conduit is set in a concrete structure. The body of the sealing member 6 being thin is adapted to be pierced or split and spread or else torn out of the bushing if its use is not found desirable. The bushing and seal may be easily manufactured in quantity at a comparatively slight expense of material and by means of facilities ordinarily available.

I claim:

A conduit bushing having a rounded enlargement upon its outer end which projects inwardly beyond the bore of the bushing and opposes one end of a conduit upon which the bushing is received, and a sealing disk of deformable and malleable metal for closing the outer end of the bushing and having a relatively thick edge portion to be clamped between the rounded enlargement and conduit end whereby such edge portion will be mashed to lock the bushing against counter rotation and to afford a seal between the conduit and bushing.

JOHN A. SPAHN.